United States Patent [19]

Curry

[11] Patent Number: 4,893,136
[45] Date of Patent: Jan. 9, 1990

[54] ARITHMETICALLY COMPUTED MOTOR HUNT COMPENSATION FOR FLYING SPOT SCANNERS

[75] Inventor: Douglas N. Curry, Menlo Park, Calif.

[73] Assignee: Xerox Corporation, Stamford, Conn.

[21] Appl. No.: 288,501

[22] Filed: Dec. 22, 1988

[51] Int. Cl.$^4$ .................. G01D 15/14; H04N 1/04
[52] U.S. Cl. .................. 346/108; 358/474; 358/486
[58] Field of Search ........... 346/108, 107 R, 160, 346/76 L; 358/296, 300, 302, 474, 486; 346/108, 107 R, 160, 76 L

[56] References Cited

U.S. PATENT DOCUMENTS 4,639,789  1/1987  Curry ............................. 358/474
4,786,919  11/1988  Bidner et al. ................... 346/108

Primary Examiner—B. A. Reynolds
Assistant Examiner—Mark Reinhart

[57] ABSTRACT

An arithmetic frequency synthesizer having an accumulator for recursively accumulating a R-bit long input word at a predetermined reference frequency to generate a variable frequency bit clock for a flying spot scanner with a rotating polygon for cyclically scanning an intensity modulated light beam across a photosensitive recording medium includes means for arithmetically modulating the value of the accumulator input word on a scan cycle-by-scan cycle basis for adjusting the bit clock frequency to compensate for polygon motor hunt errors. There is a counter which is incremented or decremented during each scan cycle at a frequency which is scaled to the reference frequency, whereby the count accumulated by the counter during each scan cycle is a measure of the average angular velocity of the polygon during that cycle. This count is offset by a calibrated R-bit long bias value; either by preloading the bias value, into the counter at the start of each scan cycle or by summing the bias value, in whole or part, with the accumulated count. The bias value is selected so that offset count or the averaged offset count accumulated during one or more earlier scan cycles, respectively, defines the modulated input word value, adjusts the frequency of the bit clock to compensate substantially for the average motor hunt occurring during the earlier scan cycle or cycles.

1 Claim, 3 Drawing Sheets

ARITHMETICALLY COMPUTED MOTOR HUNT COMPENSATION FOR FLYING SPOT SCANNERS

FIELD OF THE INVENTION

This invention relates to arithmetic frequency synthesizers for generating variable frequency bit clocks for flying spot scanners and, more particularly, to cost reduced means for adjusting the frequency of the bit clock generated by such a frequency synthesizer to compensate for ordinary velocity variations of the open loop polygon drive motors ("motor hunt errors") that are sometimes employed in such scanners.

BACKGROUND OF THE INVENTION

Flying spot scanners (sometimes also referred to as "raster output scanners") conventionally have a reflective, multi-faceted polygon which is rotated about its central axis to repeatedly sweep one or more intensity modulated light beams across a photosensitive recording medium in a fast scan or "line scanning" direction while the recording medium is being advanced in an orthogonal slow scan or "process" direction, such that the beam or beams scan the recording medium in accordance with a raster scanning pattern. Digital printing is performed by serially intensity modulating each of the beams in accordance with a binary sample stream, whereby the recording medium is exposed to the image represented by the samples as it is being scanned.

As is known, the quality of the image printed by a digital printer depends to a substantial extent upon the precision with which the individual picture elements ("pixels") of the printed image are positioned on the recording medium. Spatially precise pixel positioning is especially important for printers which are supplied with a large number of data samples for each pixel to carry out half tone printing. Thus, quality digital printers typically include a scan buffer for temporarily storing the data samples, together with a bit clock for controlling the rate at which the samples are applied to the modulator.

It has been recognized that the frequency of the bit clock for a printer of the foregoing type can be adjusted to compensate for (1) variations in the rotational velocity of the polygon ("motor hunt errors"), (2) variations in the angular velocity at which the modulated light beam or beams are swept across the recording medium by the different facets of the polygon ("polygon signature error"), and (3) variations in the linear velocity at which the beam or beams are scanned across scan line segments that subtend different sectors of the scan angle ("scan non-linearity errors"). See, for example, the following commonly assigned U.S. Patents: U.S. No. 4,622,593 of D. N. Curry on "Polygon Signature Correction," U.S. No. 4,639,789 of D. N. Curry on "Raster Scanner Variable Frequency Clock Circuit," and U.S. No. 4,766,560 of D. N. Curry et al. on "Parallel/Pipelined Arithmetic Variable Clock Frequency Synthesizer." Those patents are hereby incorporated by reference, but U.S. No. 4,766,560 is singled out because the arithmetic frequency synthesizer disclosed therein is a favored variable frequency bit clock generator for carrying out the present invention.

As is known, polygon signature errors and scan non-linearity errors are calculable for a given printer and are essentially invariant as a function of time. In the interest of simplifying this disclosure, it will be assumed they can be ignored, although that generally implies that suitable provision has been made to adjust the bit clock frequency as required to compensate for them. Motor hunt errors are the principal topic of concern, so it is to be understood that polygon drive motors sometimes are operated open loop to avoid the additional cost and complexity of providing speed control servos for them. When an open loop drive motor is employed, the angular velocity of the polygon typically varies at low frequency as a function of time under the influence of several variables, such as the environmental conditions and the electromechanical transfer function of the polygon and its drive motor.

The known prior art demonstrates that the frequency of a bit clock can be adjusted to compensate for these motor hunt errors, either by adding pulses to or subtracting pulses from a crystal generated bit clock stream, as in U.S. No. 4,639,789, or by incrementally increasing or decreasing the value of a fixed length word that is recursively accumulated by an accumulator of an arithmetic frequency synthesizer, as in U.S. No. 4,766,560. Although these existing motor hunt compensation techniques are effective, they suffer from being relatively complex and costly to implement. In particular, the above described motor hunt compensation techniques have relied upon a microprocessor for retrieving an appropriate bit clock frequency correction value from a table look-up memory in response to a polygon angular velocity dependent count accumulated by a counter. It, therefore, will be understood that the cost and complexity of compensating for such polygon motor hunt errors could be significantly reduced by providing a low cost alternative to the microprocessor and table look-up memory.

SUMMARY OF THE INVENTION

To that end, in accordance with the present invention, the bit clock for a digital printer having a flying spot scanner with a rotating polygon for cyclically scanning a data modulated light beam across a recording medium is generated by an arithmetic frequency synthesizer which has its operating point arithmetically updated for each scan cycle, such that the frequency of the bit clock is adjusted to remain substantially proportional to the angular velocity of the polygon, even if the polygon velocity drifts because of ordinary open loop, motor hunt errors. To carry out the invention, a digital counter is incremented or decremented at a predetermined frequency during each scan cycle, whereby the count through which it is stepped during any given cycle is a measure of the average angular velocity of the polygon for that particular scan cycle. That count, either alone or after being averaged with the polygon measuring counts from one or more prior scan cycles, in turn is summed with a predetermined binary bias value to provide an updated input word value for updating the operating point of the frequency synthesizer for the next scan cycle. The sum of the count and the bias hold the frequency synthesizer at a nominal operating point when the polygon is rotating at its nominal angular velocity. But, the bias, in turn is selected so that when the count deviates from its nominal value, the operating point of the frequency synthesizer is shifted by an equal and opposite amount of its nominal value, thereby adjusting the frequency of the bit clock to compensate for variations in the angular velocity of the polygon.

BRIEF DESCRIPTION OF THE DRAWINGS

Further advantages and feature of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to certain illustrated embodiment, it is to be understood that there is no intent to limited to those embodiments. On the contrary, the aim is to cover all modifications, alternatives and equivalents falling within the spirit and scope of the invention as defined by the appended claims.

Figure 1:
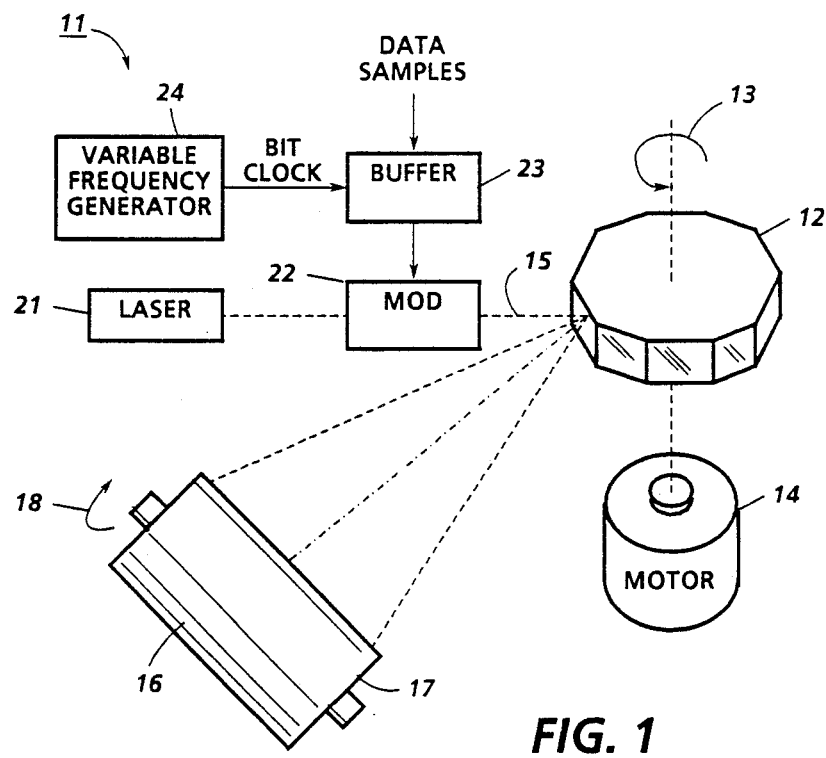
FIG. 1 is a simplified schematic diagram of a laser printer having a flying spot scanner with which the present invention may be employed to provide motor hunt compensation.

Turning now to the drawings, and at this point especially to FIG. 1, there is a more or less conventional digital printer 11 (shown only in relevant part) having a reflective, multi-faceted polygon 12 which is rotated about its central axis, as indicated by the arrow 13, by a motor 14 to repeatedly scan an incident, intensity modulated light beam 15 in a fast scan or "line scanning" direction across a photosensitive recording medium 16, such as a xerographic photoreceptor. While being scanned by the light beam 15, the recording medium 16 is advanced (by means not shown) in an orthogonal slow scan or "process" direction, so the light beam 15 exposes it in accordance with a raster scanning pattern. As illustrated, the recording medium 16 is coated on a drum 17 which is rotated about its longitudinal axis, as indicated by the arrow 18, but it will be evident that this is merely an example of a suitable transport configuration.

As a general rule, the light beam 15 is supplied by a laser 21 and is intensity modulator in accordance with data samples that are serially applied to a modulator 22. For controlling the rate at which the light beam 15 is modulated, the data samples are temporarily stored in a scan buffer 23 or the like which is clocked by a bit clock supplied by a variable frequency bit clock generator 24. The data samples represent individual dots of a half tone image or pixels of a simple image (collectively referred to herein as "pixels"), so the rate at which they are applied to the modulator 22 is controlled by the bit clock generator 24 to control the positioning of the pixels on the recording medium 16.

Figure 2:
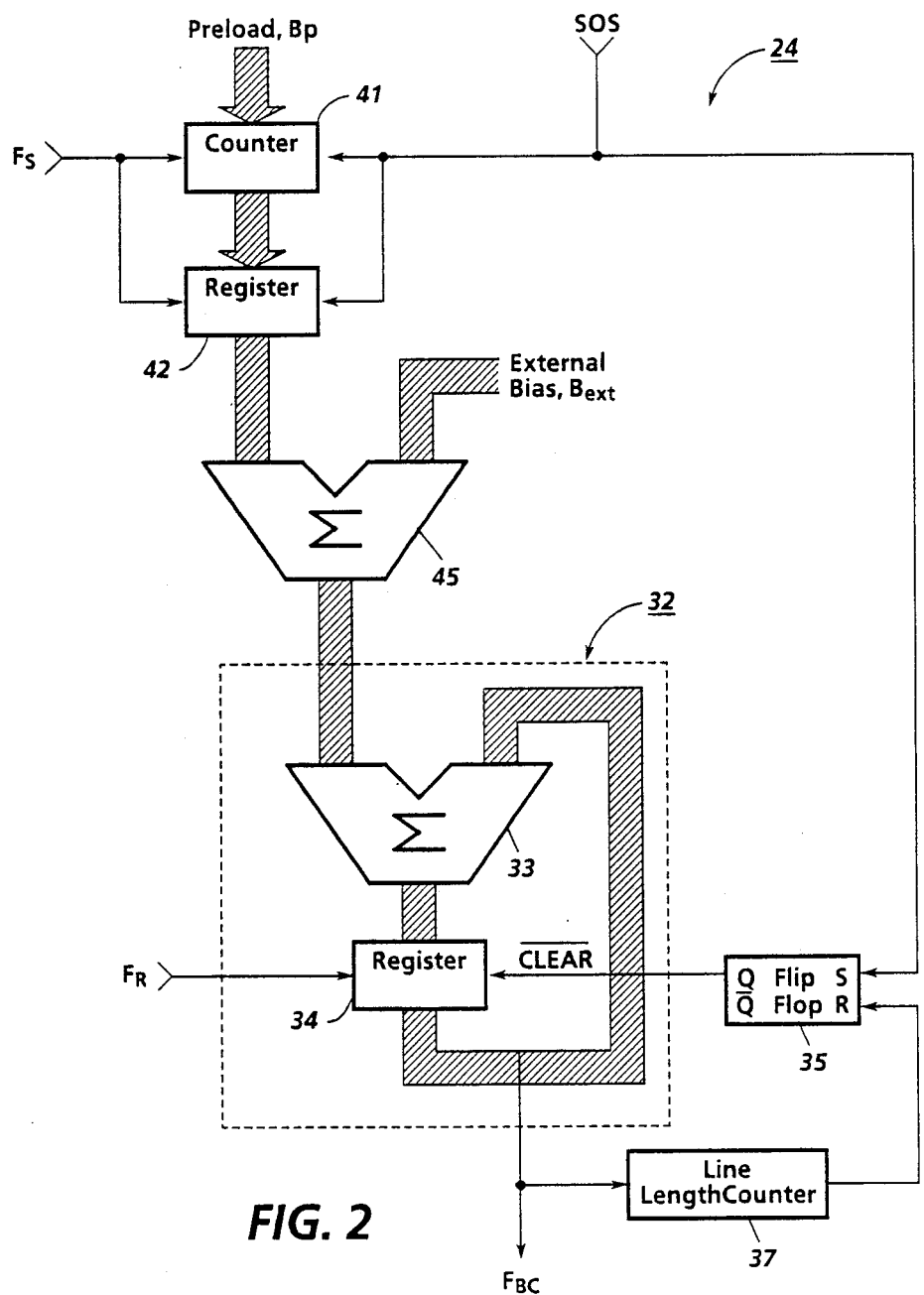
FIG. 2 is a block diagram of an arithmetic frequency synthesizer comprising a simplified embodiment of this invention.

Referring to FIG. 2, it will be seen that the bit clock generator 24 is an arithmetic frequency synthesizer having a R-bit wide accumulator 32 for recursively accumulating a R-bit wide input word, which has a time varying value N, at a predetermined reference frequency, $F_R$. For performing that function, in keeping with the teachings of U.S. No. 4,766,560, the accumulator 32 comprises a dual input port, R-bit wide adder 33 having its output port returned to one of its inputs by a R-bit wide register 34 which is clocked at the reference frequency, $F_R$. The input word is applied to the other input port of the adder 33, so that most significant bit (MSB) of the accumuland of the accumulator 32 oscillates at a bit clock frequency, $F_{BC}$, which is given for any value of N within the range $-2^{R-1} \leq N < 2^{R-1}$ by:

$$F_{BC} = F_R \left( \frac{N}{2^R} \right) \tag{1}$$

The accumulator 32 is idle during the "flyback" portion of each scan cycle because its register 34 is cleared at the end of each scan and remains in that state until the start of the next scan. For example, the register 34 suitably is cleared during flyback by a low ("0") logic level signal, $\overline{CLEAR}$, which is asserted and deasserted by a flip-flop 35 in response to an end of scan pulse, which is supplied by a line length counter 37, and a start of scan (SoS) pulse, which is supplied by a start of scan detector (not shown), respectively. Each scan line of the printed image conventionally is composed of a predetermined number of pixels (or dots in the case of a half tone image), so the counter 37 is selected to rollover and supply an end of scan pulse upon accumulating a corresponding number of bit clock pulses. The start of scan detector, on the other hand, characteristically is positioned at a short predetermined distance from the lead edge of the scan field to establish a spatial reference for resynchronizing the printing process at the beginning of each scan cycle. It accomplishes that by supplying a start of scan pulse each time the light beam 15 (FIG. 1) passes over it.

In accordance with the present invention, the value, N, of the input word for the accumulator 32 is arithmetically updated at the start of each scan cycle for maintaining the frequency of the bit clock proportional to the angular velocity of the polygon 12 (FIG. 1). As will be seen, the updated input word value, N, for the accumulator 32 includes a component which is determined by the sum of a count, C, that is accumulated by a counter 41 during the preceding scan cycle (as more fully described hereinbelow, the input word value may be determined by using the average of the counts that are accumulated by the counter 41 during a plurality of scan cycles), plus any external bias, $B_{ext}$ that is required to cause the frequency synthesizer 31 to operate at a predetermined nominal operating point when the polygon 12 (FIG. 1) is rotating at its nominal angular velocity. For purposes of this disclosure, it will be assumed that the sum of the count C plus the external bias, $B_{ext}$, fully defines the accumulator input word value, N, although it will be understood that the input word value for the accumulator 32 may be increased or decreased in practice by other components, such as polygon signature correction values and scan non-linearity correction values. Thus, it will be evident that the so-called nominal value, $N_{nom}$, of the accumulator input word may vary from facet-to-facet of the polygon 12 as any function of any polygon signature correction values and may vary during the course of such scan as a function of scan non-linearity correction values.

In view of the simplifying assumption that has been made, the input word value for the accumulator 32 may be expressed as being:

$$N = C + B_{ext} \tag{2}$$

where:

$C = \Delta C + B_p$;

$\Delta C$ = the count through which the counter 41 is stepped from the start of one scan cycle to the start of the next scan cycle; and $B_p$ = any bias count that is preloaded into the counter 41.

As illustrated, the counter 41 is incremented or decremented at a predetermined frequency, $F_S$, so the count, $\Delta C$, through which it is stepped during each scan cycle is a measure of the average angular velocity at which the polygon 12 (FIG. 1) is then rotating. This relationship can be expressed as follows:

$$\frac{1}{\omega f} = \frac{\Delta C}{F_S} \qquad (3)$$

where $\omega$ = the angular velocity of the polygon 12; and
$f$ = the number of facets on the polygon 12.

Any minor differences in the angles subtended by the facets of the polygon 12 about its axis of rotation, as well as any slight eccentricity of the polygon facets with respect to that axis, can be ignored, especially because polygon signature compensation may be employed, if desired, for adjusting the accumulator input valve, N, to compensate for them.

The count accumulated by the counter 41 during one scan cycle is loaded into a register 42 at the start of the next scan cycle, and the counter 41 simultaneously is cleared in preparation for measuring the velocity at which the polygon 12 rotates during the next scan cycle. As will be seen, the count, $\Delta C$, through which the counter 41 is stepped during each scan cycle is summed with a predetermined binary bias value, $B = B_{ext} + B_p$, such that any deviation, $\epsilon$, of the count, $\Delta C$, from its nominal value, $\Delta C_{nom}$, equally and oppositely countershifts the accumulator input word value, N, with respect to its nominal value, $N_{nom}$.

More particularly, the bias, B, is selected so that:

$$\Delta C_{nom} + B = -\{C_{nom} \qquad (4)$$

Therefore, $$B = -2\Delta C_{nom} \qquad (5)$$

Furthermore, when the polygon 12 is rotating at its nominal angular velocity, $\omega_{nom}$, $$N_{nom} = -\Delta C_{nom} \qquad (6)$$

so $$N_{nom} \pm \epsilon = -\Delta C_{nom} \pm \epsilon \qquad (7)$$

U.S. No. 4,766,560 teaches that the frequency of the bit clock generated by an arithmetic frequency synthesizer is independent of the vector direction of its accumulator input word value, N, so equation (7) demonstrates that the bias, B, called for by equation (5) simply poles the accumulator input word so that any variation in either direction of the count, $\Delta C$, will cause the accumulator input word value, N, to vary in the opposite direction by an equal amount. Thus, it will be understood that the counter 41 may be either an up counter or a down counter.

Now, equation (3) can be rewritten to express the nominal angular velocity of the polygon 12 (FIG. 1), $\omega_{nom}$, in terms of the nominal input word value, $N_{nom}$, for the accumulator 32 as follows:

$$\frac{1}{\omega_{nom} f} = \frac{N_{nom}}{F_S} \qquad (8)$$

Equations (1) and (8), in turn, can be solved as simultaneous equations to determine the scaling frequency, $F_S$, for varying the count, $\Delta C$, through which the counter 41 is stepped during each scan cycle on an appropriate scale to compensate for motor hunt errors when employing any given reference frequency, $F_R$. More particularly, it follows from equation (8) that:

$$N_{nom} = \frac{F_S}{\omega_{nom} f} \qquad (9)$$

Equation (1), on the other hand, shows that:

$$F_R = (F_{BC_{nom}}) \left( \frac{2^R}{N_{nom}} \right) \qquad (10)$$

where $F_{BC_{nom}}$ is the nominal bit clock frequency.

Thus, by substituting equation (9) into equation (10), it is found that:

$$F_R = (F_{BC_{nom}})(2^R) \left( \frac{\omega_{nom} f}{F_S} \right) \qquad (11)$$

so $$F_R F_S = (F_{BC_{nom}})(2^R)(\omega_{nom} f) \qquad (12)$$

Typically, the scaling frequency, $F_S$, is selected to equal the reference frequency, $F_R$, so that a single crystal oscillator (not shown) can be employed for supplying both of them. The nominal bit clock frequency, $F_{BC_{nom}}$, required for printing a specified number of pixels on a scan line when the polygon 12 (FIG. 1) is rotating at its nominal angular velocity $\omega_{nom}$, can be calculated straightforwardly, so it will be understood that the frequency of the crystal oscillator that is needed for the above case is given by:

$$F_R = F_S = \sqrt{(F_{BC_{nom}})(2^R)(\omega_{nom} f)} \qquad (13)$$

At this point it will be understood that the frequency, $F_{BC}$, of the bit clock will increase and decrease when the polygon 12 (FIG. 1) speeds up and slows down, respectively, thereby tending to stabilize the spatial frequency of the bit clock with respect to the scan field of the scanner 11 when motor hunt errors occur. Moreover, it will be apparent that this invention may be carried out, regardless of the distribution of the bias value B. Nevertheless, the distinction between the preload bias $B_p$, and the external bias, $B_{ext}$, may be important, especially if scan non-linearity compensation is employed, because the correction values for scan non-linearities are most easily applied to vary the external bias, $B_{ext}$, as a function of the linear scan position.

Turning now to a dynamic analysis of the present invention, it will be evident that the foregoing discussion does not fully account for dynamic variations in the angular velocity of the polygon 12 (FIG. 1). Absolute motor hunt compensation is provided only if the product of the bit clock frequency given by equation (1), times the scan time given by equation (3) is constant, so that:

$$\left(F_R \frac{N}{2^R}\right)\left(\frac{\Delta C}{F_S}\right) = k \tag{18}$$

where k is a constant equal to the number of clock bits per scan cycle.

Equation (18) can be rewritten by reordering its terms as:

$$N\Delta C = \frac{2^R F_S k}{F_R} = K \tag{19}$$

where K is a constant.

However, the essence of that relationship can be maintained only for small variations, $\epsilon$, (with respect to the nominal count $\Delta C_{nom}$) in the count, $\Delta C$, through which the counter 41 is stepped during each scan cycle, such that $$(N_{nom} \pm \epsilon)(\Delta C_{nom} \mp \epsilon) \approx K \tag{20}$$

That, in turn, means that the motor hunt compensation technique of the present invention has a limited dynamic range. Consequently, it is noted that ordinary motor hunt errors of modern open loop polygon drive motors usually are confined to a range of about ± one percent or so, which is well within the effective dynamic range of this invention.

Figure 3:
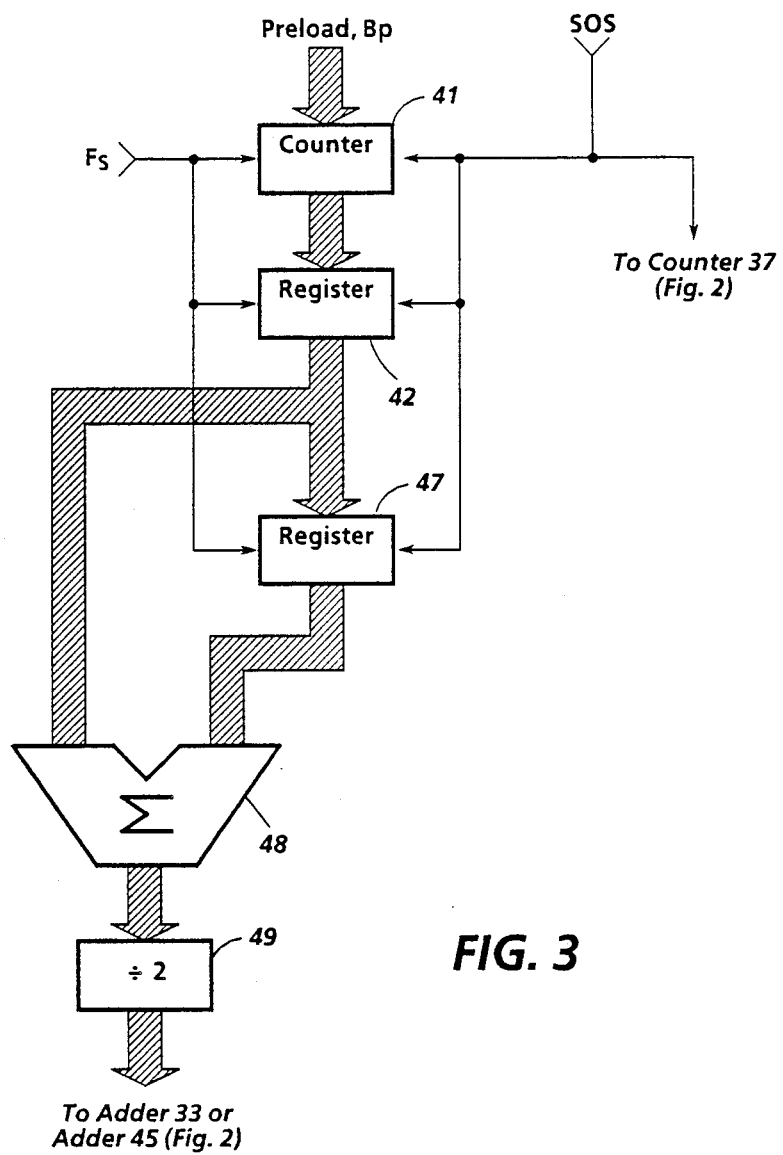
FIG. 3 is a block diagram of a modified polygon velocity sensor for the frequency synthesizer shown in FIG. 2.

If desired, the count, C that is accumulated by the counter 41 during any given scan cycle (the "accumulated count" being defined by the count, $\Delta C$ through which the counter 41 is stepped plus any preloaded bias count, $B_p$) may be employed for directly updating the accumulator word value, N, so as to provide any needed motor hunt compensation for the next scan cycle. Preferably, however, the updates for the accumulator input word value, N, are based on polygon velocity measurements that span two or more of scan cycles, so that the frequency, $F_{BC}$, of the bit clock generated by the frequency synthesizer 31 is more smoothly varied to compensate for any motor hunt errors. For that reason, as shown in FIG. 3, the accumulated count that is loaded into the register 42 at the start of one scan cycle is shifted into a second register 47 at the start of the next cycle. Furthermore, there is an adder 48 for summing the counts contained by the registers 42 and 47 with each other and a divide by two divider 49 for averaging those two counts. If the counts contained by the registers 42 and 47 include the bias value, B, the divider 49 may apply their average directly to the accumulator 32 for updating the accumulator input word value, N, to compensate for the average motor hunt error. If, on the other hand, the two counts are averaged prior to adding all or part of the bias, B, to them, the adder 45 is needed for adding an external bias, $B_{ext}$, to the averaged count prior to updating the accumulator input word value, N.

Typically, the bit clock frequency, $F_{BC}$, generated by the arithmetic frequency synthesizer 24 can be controlled with sufficient precision for quality printing by employing a word length, R, of about twenty bits (R=20). However, in a properly functioning printer, the small motor hunt errors that occur will only affect the values of the less significant bits of the accumulator input word. Therefore, the counter 41 may roll over several times during each scan cycle because it need only have sufficient capacity to accurately capture the motor hunt sensitive bits of the accumulator input word. The more significant bits of the accumulator input word, N, may be defined by the external bias, $B_{ex}$, to be combined with its less significant, motor hunt sensitive bits as determined by the counter 41. As a result, the counter 41 may be selected to have a bit length which is only a fraction of the accumulator word length. For example, a twelve bit long counter 41 can be employed for updating the value, N, of a twenty bit wide accumulator input word in accordance with the polygon motor hunt errors that occur during ordinary operation of the printer 11 (FIG. 1),

CONCLUSION

In view of the foregoing, it now will be understood that the present invention provides easily implemented and inexpensive methods and means for varying the frequency of a bit clock generated by an arithmetic frequency synthesizer so as to compensate for the ordinary polygon motor hunt errors of a flying spot scanner. Provision is made for arithmetically updating the operating point of such a frequency synthesizer in accordance with such motor hunt errors, so it will be evident that a low cost alternative has been provided for the microprocessor and table look-up memory that were previously needed to perform that function. Furthermore, it will be appreciated that the polygon motor hunt compensation technique of the present invention can be employed alone, although it is likely to be combined in practice with other means for controlling the frequency and/or phase of the bit clock, such as for polygon signature error correction and/or polygon non-linearity scan error correction.

What is claimed is:

1. In a flying spot scanner having a rotating polygon with a drive motor for cyclically scanning an intensity modulated light beam across a photosensitive recording medium in a line scanning direction while said recording medium is being advanced in an orthogonal process direction, a modulator for modulating said light beam in accordance with data samples representing an image, a buffer for storing said data samples, and an arithmetic frequency synthesizer having an accumulator for recursively accumulating a R-bit long word having a time varying value N at a predetermined reference frequency to generate a variable frequency bit clock for serially shifting said data samples from said buffer to said modulator at a rate controlled by the frequency of said bit clock, the improvement comprising counter means for accumulating counts during each of said scan cycles at a frequency scaled to said reference frequency, whereby the count accumulated by said counter means during any given scan cycle is a measure of the rotational velocity of said polygon during said given scan cycle, means for offsetting the accumulated counts by a predetermined bias selected to cause the offset counts to be the accumulator input word values that causes said arithmetic frequency synthesizer to vary the frequency of said bit clock when required for maintaining the bit clock frequency for any subsequent scan cycle multiplied by the rotational velocity of said polygon during at least one preceding scan cycle substantially constant, thereby compensating for any normal polygon motor hunt errors.

* * * * *